(No Model.)

J. B. HATCH & W. N. STROUD.
WHEEL.

No. 391,045. Patented Oct. 16, 1888.

Witnesses.
Henry G. Dieterich
C. E. Doyle

Inventors.
J. B. Hatch
W. N. Stroud
By their Attorneys

United States Patent Office.

JEROME B. HATCH, OF DALLAS, AND WILEY N. STROUD, OF WAXAHATCHIE, TEXAS.

WHEEL.

SPECIFICATION forming part of Letters Patent No. 391,045, dated October 16, 1888.

Application filed July 24, 1888. Serial No. 280,875. (No model.)

*To all whom it may concern:*

Be it known that we, JEROME B. HATCH, of Dallas, Dallas county, Texas, and WILEY N. STROUD, of Waxahatchie, in the county of Ellis and State of Texas, citizens of the United States, have invented new and useful Improvements in Wheels, of which the following is a specification.

Our invention relates to improvements in main or driving wheels for reapers, harvesters, binders, and other similar machines wherein the operation of the device depends upon the rotation of a wheel in contact with the ground.

In the ordinary practice wheels of this character are provided with transverse ribs, which engage the surface when traversing soft, moist, or marshy soils; but in passing over hard soils these ribs cause a jolting of the machinery, which results in an irregular operation thereof.

The object of this invention is to provide simple and efficient means for overcoming this difficulty without losing the advantage to be derived from the ribs when the wheels are passing over soft ground.

The invention consists in a certain novel construction and combination of devices, fully set forth hereinafter, in connection with the accompanying drawings, wherein—

Figure 1:
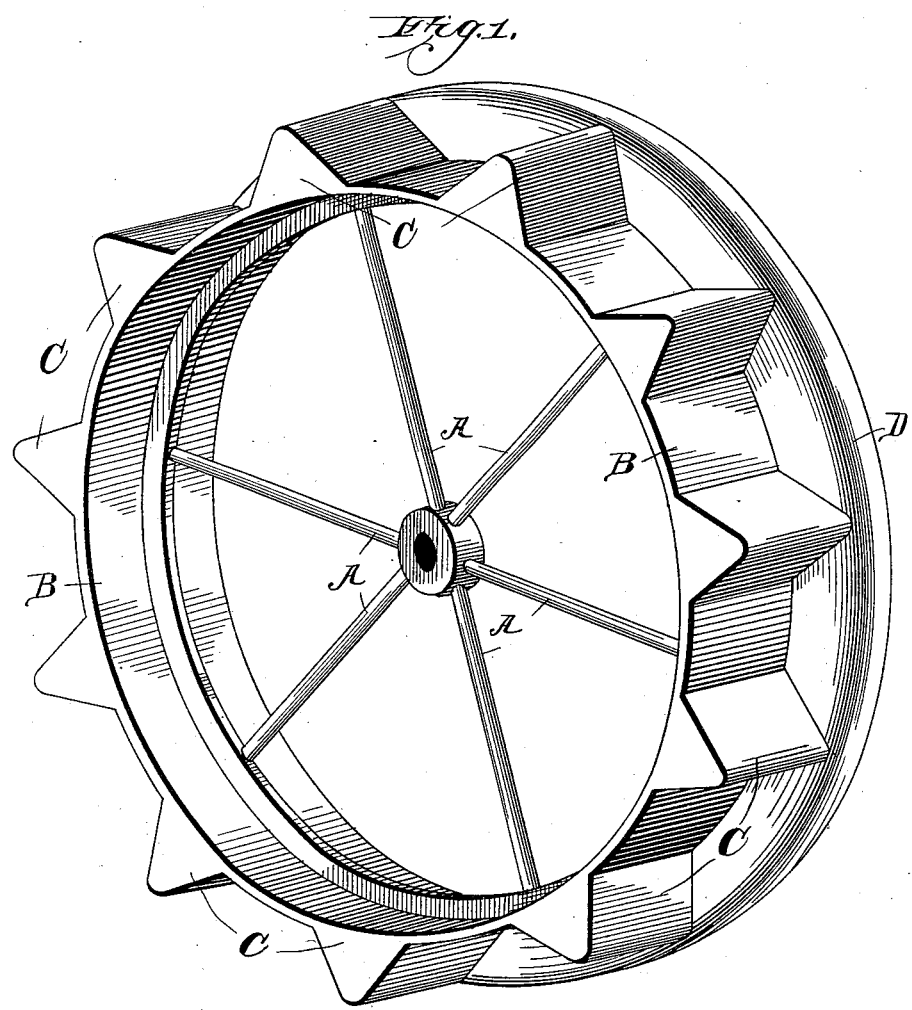
Figure 2:
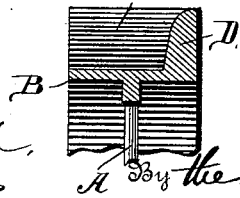

Figure 1 represents a perspective view of the improved wheel, and Fig. 2 represents a detail sectional view.

Referring to the drawings, the spokes A, which may be of any ordinary or suitable construction or pattern, are attached at their outer ends to the flat rim B, and C C represent transverse ribs or lugs, which are attached to or cast integral with the outer side of the rim. These ribs or lugs are tapered or wedge-shaped toward their outer edges, and the said edges are rounded, as shown in the drawings.

D represents an annular flange, which is attached to or formed integral with the rim on one side thereof, and the said flange is of the same height as the lugs or ribs. This flange is also tapered on its inner side, as shown.

The flange and the ribs or lugs may be either cast integral with the rim of the wheel, as shown in the drawings, or attached thereto in any ordinary or preferred manner.

The advantages of the invention are that in traversing soft and marshy soil the ribs or lugs engage in the surface in the ordinary way; but in passing over hard or stony soil the flange bears on the surface and prevents jarring. The ribs and the flange are flush with each other at their outer edges, and this height may be considerably more than that of the ordinary ribs, as will be seen, for the reason that the said height does not affect the regularity of motion of the wheel in passing over hard soil.

The advantage in tapering the ribs or lugs and the inner side of the flange is to prevent earth from clogging therein and interfering with the effectiveness of the wheel.

Having thus described our invention, what we claim, and desire to secure by Letters Patent of the United States, is—

A wheel having a flat rim provided with tapered or wedge-shaped ribs or lugs C C, rounded at their outer edges, and the peripheral flange D, integral with the rim and the ribs or lugs and tapered or rounded on its inner side to a rounded edge, the outer edge of the flange being flush with the outer edges of the ribs or lugs, substantially as specified.

In testimony that we claim the foregoing as our own we have hereto affixed our signatures in presence of two witnesses.

JEROME B. HATCH.
WILEY N. STROUD.

Witnesses to signature of Jerome B. Hatch:
E. B. BARYE,
JNO. BOOKHAUT.

Witnesses to signature of Wiley N. Stroud:
A. R. LOGAN,
J. N. WHITTENBERG.